United States Patent [19]
Omi et al.

[11] Patent Number: 5,349,449
[45] Date of Patent: Sep. 20, 1994

[54] IMAGE DATA PROCESSING CIRCUIT AND METHOD OF ACCESSING STORING MEANS FOR THE PROCESSING CIRCUIT

[75] Inventors: Ikuhiro Omi, Osaka; Hideo Azumai, Osaka; Satoshi Iwatsubo, Osaka, all of Japan

[73] Assignee: Mita Industrial Co., Ltd., Osaka, Japan

[21] Appl. No.: 86,906

[22] Filed: Jul. 7, 1993

[30] Foreign Application Priority Data

Jul. 13, 1992 [JP] Japan .................................. 4-185560

[51] Int. Cl.$^5$ .............................................. H04N 1/40
[52] U.S. Cl. .................................. 358/448; 358/444; 364/134
[58] Field of Search ............... 358/404, 409, 435, 442, 358/444, 448, 468, 400; 395/425; 364/134

[56] References Cited
U.S. PATENT DOCUMENTS

4,954,951 9/1990 Hyatt .................................. 395/425

Primary Examiner—Edward L. Coles, Sr.
Assistant Examiner—Madeleine Anh-Vinh Nguyen
Attorney, Agent, or Firm—Beveridge, DeGrandi, Weilacher & Young

[57] ABSTRACT

A circuit according to the present invention has an input image processing circuit 11 and an image output processing circuit 12 which are asynchronously operated and a shared memory 18. In addition, it has a memory access signal switching circuit 110. The input image processing circuit 11 and the image output processing circuit 12 access the memory 18 in synchronization with the same memory access synchronous clock SYSCLK, and the access right of the image output processing circuit 12 precedes the access right of the input image processing circuit 11. If one cycle of the processing operation of the input image processing circuit 11 is set longer than the sum of the maximum time period during which the input image processing circuit 11 accesses the memory 18 and the maximum time period during which the image output processing circuit 12 accesses the memory 18, the access to the memory 18 by the input image processing circuit 11 and the access to the memory by the image output processing circuit 12 are not overlapped with each other.

3 Claims, 4 Drawing Sheets

IMAGE DATA PROCESSING CIRCUIT AND METHOD OF ACCESSING STORING MEANS FOR THE PROCESSING CIRCUIT

CROSS REFERENCE TO RELATED APPLICATIONS

This application claims priority benefits under 35 USC §119 of Japanese Patent Application Serial No. 185560/1992, filed on Jul. 13, 1992, the disclosure of which is incorporated herein by reference.

BACKGROUND OF THE INVENTION

1. Field of the Invention

The present invention relates generally to an image data processing circuit having a shared memory, and more particularly, to such an image data processing circuit that a first image data processing circuit and a second image data processing circuit which are asynchronously operated share a memory.

2. Description of the Prior Art

Description is made by taking a facsimile as an example. The facsimile generally comprises an input image processing circuit serving as a first image data processing circuit and an image output processing circuit serving as a second image data processing circuit. The input image processing circuit drives an image sensor and processes document image data read by the image sensor. The image output processing circuit processes the image data to correspond to a recording device such as a printer and drives the recording device to record an image on paper or the like.

Meanwhile, in the facsimile, input image processing is processing required to read a document image and transmit the same to the other side of the communication through a telephone line or the like, which is separate processing from image output processing for recording an image on paper or the like, so that there is no necessity of synchronously performing the input image processing and the image output processing. Therefore, as the grade of the facsimile becomes higher, there have been requests such as a request that while an image is being recorded on paper or the like, a new document image is read by the image sensor and a request that while a document image is being read by the image sensor, another image is recorded on paper or the like.

On the other hand, in the input image processing and the image output processing, a memory for storing processed images once is indispensable. Therefore, the facsimile in which the input image processing and the image output processing are asynchronously performed has been conventionally provided with separate memories for the input image processing and the image output processing.

If memories are respectively provided for the input image processing and the image output processing, however, the cost of a circuit for the input image processing and the image output processing is high due to the memories.

When there are provided the input image processing circuit and the image output processing circuit which are asynchronously operated, therefore, the following constructions have been so adopted that a necessary memory can be shared between both the circuits. Specifically:

A. Such construction that the input image processing circuit and the image output processing circuit which are asynchronously operated are not simultaneously operated, or B. Such construction that an arbitrating circuit is provided in order that the input image processing circuit and the image output processing circuit do not simultaneously access the memory.

Figure 4:
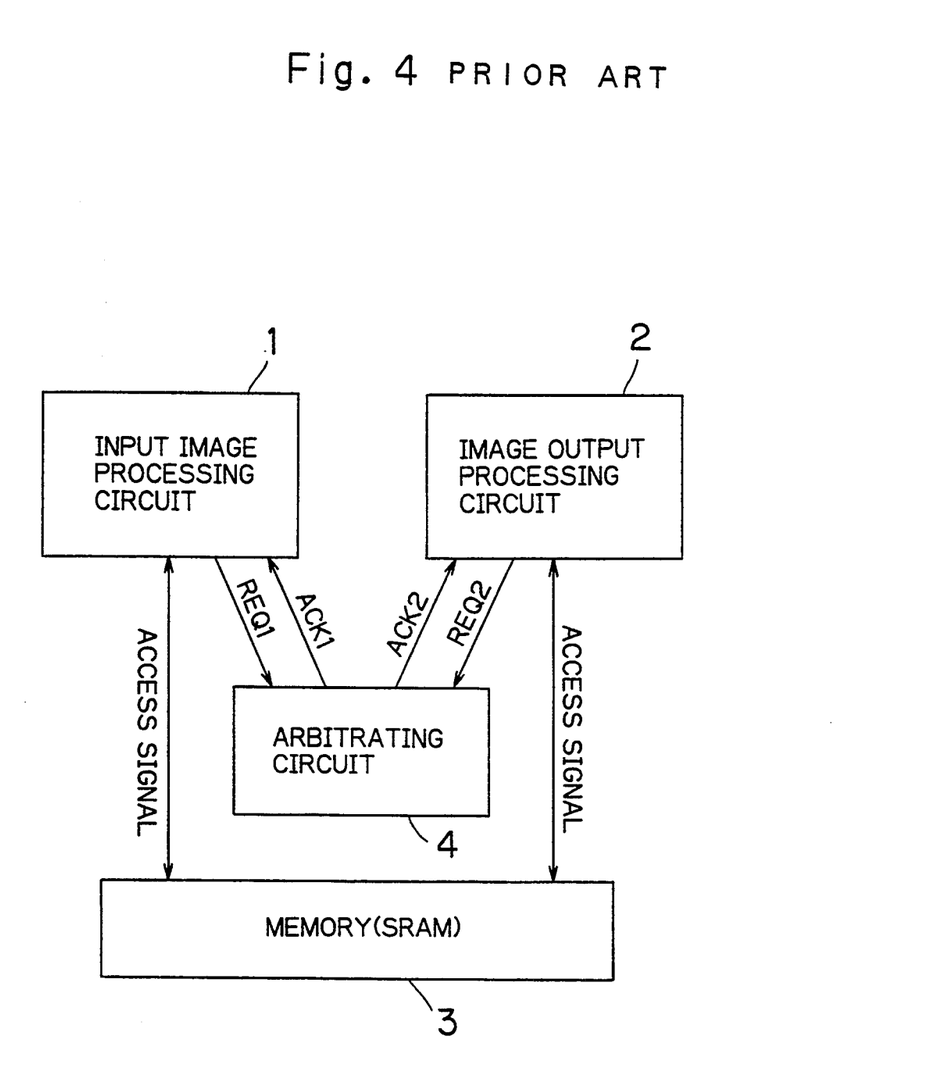
FIG. 4 is a block diagram showing the construction of a conventional circuit provided with an arbitrating circuit for accessing a memory.

The above described construction B will be described more concretely with reference to a block diagram of FIG. 4.

A shared memory (for example, a static random access memory: SRAM) 3 is connected to an input image processing circuit 1 and an image output processing circuit 2. In addition, an arbitrating circuit 4 is connected to the input image processing circuit 1 and the image output processing circuit 2. The arbitrating circuit 4 judges whether or not the image output processing circuit 2 is accessing the memory 3 when a memory request signal REQ1 is applied from, for example, the input image processing circuit 1, and sends to the input image processing circuit 1 an acknowledgment signal ACK1 indicating that access to the memory 3 for a predetermined time period t1 is allowed when the image output processing circuit 2 is not accessing the memory 3. Correspondingly, the input image processing circuit 1 accesses the memory 3 for the predetermined time period t1. When the input image processing circuit 1 continues to access the memory 3, it outputs the memory request signal REQ1 to the arbitrating circuit 4 again and waits to access the memory 3 until the acknowledgment signal ACK1 is sent from the arbitrating circuit 4.

Similarly, when the image output processing circuit 2 accesses the memory 3, it first outputs a memory request signal REQ2 to the arbitrating circuit 4. The image output processing circuit 2 can access the memory 3 for a predetermined time period t2 after an acknowledgment signal ACK 2 indicating that access to the memory 3 is allowed is applied from the arbitrating circuit 4.

Meanwhile, the unit time periods t1 and t2 during which the input image processing circuit 1 and the image output processing circuit 2 can respectively access the memory 3 are predetermined.

Consequently, timing at which and a time period during which the input image processing circuit 1 accesses the memory 3 and timing at which and a time period during which the image output processing circuit 2 accesses the memory 3 are so arbitrated by the arbitrating circuit 4 as not to be overlapped with each other.

When the construction A out of the above described conventional constructions is adopted, the input image processing and the image output processing cannot be simultaneously performed, so that the function of an apparatus adopting the construction A is limited. For example, in the facsimile, the function is so limited that an image cannot be recorded on paper while a document for transmission is being read, while a document for transmission cannot be read while an image is being recorded on paper.

On the other hand, when the construction B is adopted, the scale of an entire circuit for image data processing is increased because a complicated arbitrating circuit is required, although the input image processing circuit and the image output processing circuit can be simultaneously operated. In addition, if the arbitrating circuit is provided, the input image processing circuit and the image output processing circuit must output the memory request signals to the arbitrating circuit and wait for the acknowledgment signals from the arbitrating circuit before they access the memory, so that the processing speed is reduced.

SUMMARY OF THE INVENTION

An object of the present invention is to provide, in an image data processing circuit of such construction that there are provided two circuits, that is, a first image data processing circuit and a second image data processing circuit which are asynchronously operated and a memory which is shared between both the circuits, a circuit capable of accessing the memory without increasing the cost and without limiting the function of an apparatus using the image data processing circuit in the simpler construction and a method for that.

According to the present invention, the maximum time period T1 and the maximum time period T2 during which the first image data processing circuit and the second image data processing circuit can access the memory in respective one cycles of the processing operations of the circuits are set. Access to the memory is made in synchronization with a common clock. Moreover, the access to the memory by the second image data processing circuit precedes the access to the memory by the first image data processing circuit.

When the second image data processing circuit does not access the memory, therefore, the first image data processing circuit accesses the memory for the time period T1 in each cycle. For the remaining time period in the cycle, the first image data processing circuit enters the stopped state (the wait state).

On the other hand, when the second image data processing circuit requests to access the memory, an access signal switching circuit is switched to a state where the second image data processing circuit can access the memory. At this time, the first image data processing circuit delivers the right of access to the memory to the second image data processing circuit, to enter the stopped state.

When the access to the memory by the second image data processing circuit is completed, the right of access to the memory is transferred to the first image data processing circuit, so that the first image data processing circuit releases the stopped state and continues the processing, thereby making it possible to access the memory for the time period T1.

According to the present invention, therefore, the first image data processing circuit and the second image data processing circuit which are asynchronously operated can share a memory to be accessed. In addition, a memory need not be provided for each processing circuit, thereby making it possible to construct the image data processing circuit at low cost. Moreover, the function of the entire image data processing circuit is not lowered.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

One embodiment of the present invention will be described in detail by taking a facsimile as an example.

Figure 3:
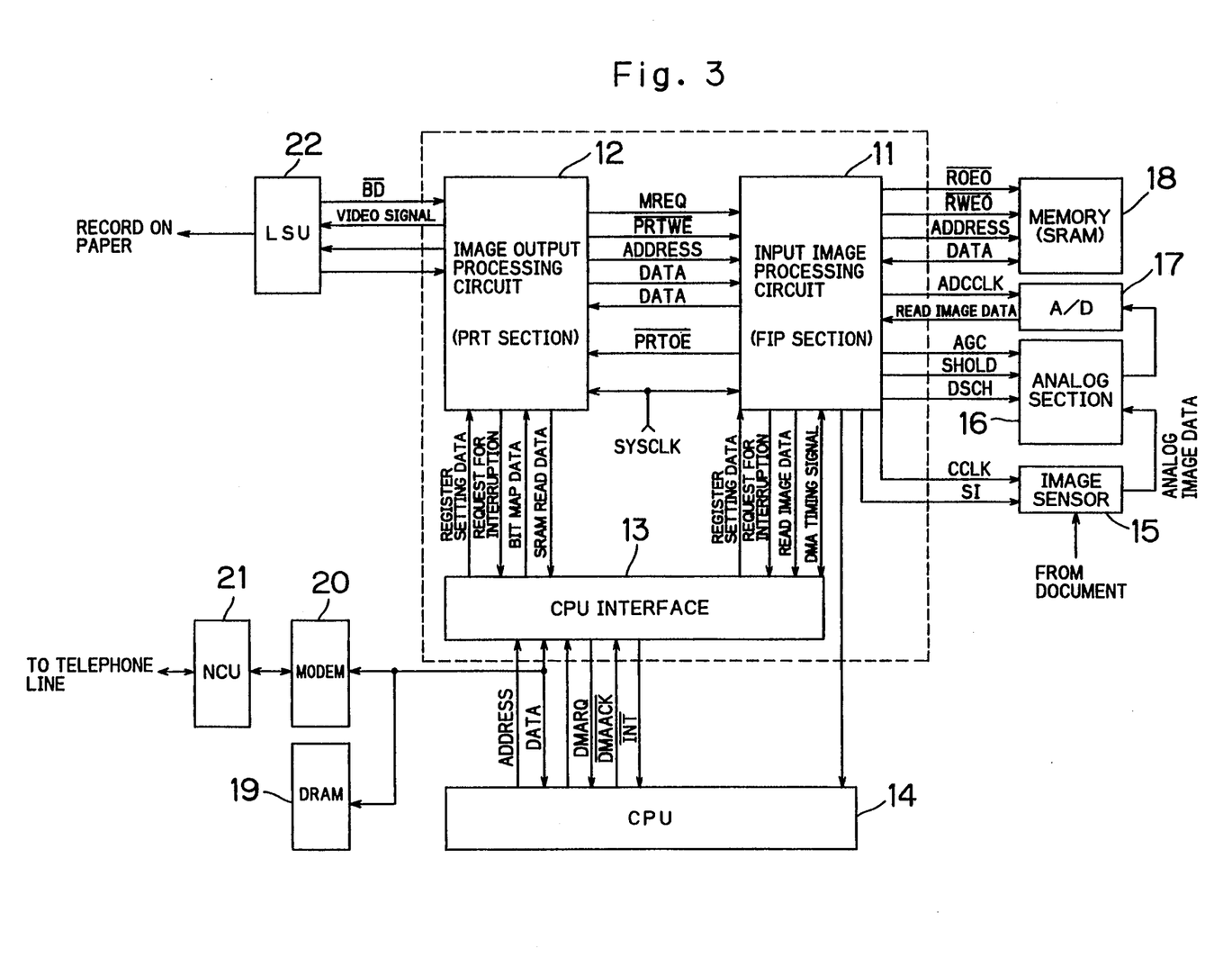
FIG. 3 is a block diagram showing the entire construction of a control circuit of a facsimile to which one embodiment of the present invention is applied.

FIG. 3 is a block diagram showing the electrical construction of a facsimile in which one embodiment of the present invention is incorporated.

The facsimile comprises an input image processing circuit (an FIP (Fax Image Sensor Processor) section) 11, an image output processing circuit (a PRT section) 12, a CPU 14 for carrying out supervisory control of the entire facsimile, and a CPU interface 13 required to connect the input image processing circuit 11 and the image output processing circuit 12 to the CPU 14. The input image processing circuit 11 and the image output processing circuit 12 are asynchronously operated. In addition, the CPU interface 13 contains a DMA (Direct Memory Access) function in the present embodiment.

When a document is set in the facsimile and is read, a driving clock CCLK and a horizontal synchronizing signal SI are applied to an image sensor 15 from the input image processing circuit 11. The image sensor 15 performs a reading operation on the basis of the applied driving clock CCLK and the applied horizontal synchronizing signal SI, to apply read analog image data to an analog section 16.

An automatic gain control signal AGC, a sample-and-hold signal SHOLD and a gain setting signal DSCH are applied from the input image processing circuit 11 to the analog section 16. The analog image data applied from the image sensor 15 is changed into a sample-and-hold signal by predetermined amplification processing, to be applied to an analog-to-digital converter 17.

The analog-to-digital converter 17 is operated by a conversion clock ADCCLK applied from the input image processing circuit 11, and converts the applied sample-and-hold signal into digital image data and applies the digital image data to the input image processing circuit 11.

In the input image processing circuit 11, various input image processing is performed with regard to the digital image data (read image data) applied from the analog-to-digital converter 17. The input image processing includes shading correction processing, binary-coded correction processing, an error diffusion processing required when a halftone is expressed, and the like with regard to the read image data.

In the input image processing, two-dimensional image processing for comparing data on a plurality of lines must be performed. Accordingly, a memory device such as a line memory for storing image data one line ahead of and two lines ahead of read image data on a given line is required. An SRAM of, for example, 32 kilo bytes is provided as the memory 18. A given area in the memory 18 is utilized as the line memory. In addition, predetermined data for shading correction operating and error diffusion processing are stored in a given area in the memory 18.

The input image processing circuit 11 applies to the memory 18 a read strobe signal /ROE0 or a write strobe signal /RWE0, and designates an address to write or read out data on a line to or from an area where the address is designated. In addition, the input image processing circuit 11 performs the input image processing of the read image data using the data on a line read out from the memory 18.

Access, that is, writing or reading of data to or from the memory 18, by the input image processing circuit 11 is made in synchronization with a memory access synchronous clock SYSCLK having a frequency of, for example, 20 MHz (as described later). 16 memory access synchronous clocks SYSCLK, for example, exist within a unit operation time period required to process data corresponding to one pixel.

The driving clock CCLK applied to the image sensor 15 has a frequency of, for example, approximately 400 KHz (the reason why such a frequency is obtained is that the operation speed of the image sensor 15 is limited). The speed of the memory access synchronous clock SYSCLK is made sufficiently higher than the speed of the image sensor 15, that is, the speed of the driving clock CCLK.

The read image data after being subjected to the input image processing is directly stored once in a DRAM 19. The data is transferred from the input image processing circuit 11 to the DRAM 19 by DMA transfer because a DMA function is contained in the CPU interface 13. The DMA transfer is performed when the read image data is applied from the input image processing circuit 11 to the CPU interface 13 and the data reaches a predetermined amount. Specifically, when the data reaches a predetermined amount, the CPU interface 13 issues a DMA request to the CPU 14, and transfers the read image data to the DRAM 19 when it receives DMA acknowledgment from the CPU 14.

The read image data stored once in the DRAM 19 is read out and subjected to compression processing by the CPU 14, to be stored in the DRAM 19 again. Although there are various systems in the standard of the facsimile of this compression processing, systems such as MMR, MR and MH, for example, are known.

The read image data compressed and stored in the DRAM 19 is read out by the CPU 14 and is applied to a modem 20. The read image data (digital data) is converted into analog data in the modem 20, and the analog data is outputted to a telephone line through an NCU (Network Control Unit) 21 and is transmitted to the facsimile on the other side of the communication.

On the other hand, when the data is transmitted through the telephone line, the data is received by the NCU 21. The received data (analog data) is converted into digital data in the modem 20 and is stored in the DRAM 19. This data is compressed data.

The compressed data stored in the DRAM 19 is read out and subjected to expansion processing by the CPU 14, to be stored in the DRAM 19 again.

Thereafter, the image data stored in the DRAM 19 again is applied to the image output processing circuit 12.

When the image data is applied from the DRAM 19 through the CPU interface 13 to the image output processing circuit 12, the image output processing circuit 12 subjects the image data to output processing, and drives an LSU 22 to record the image data subjected to the output processing on paper or the like.

The output processing performed by the image output processing circuit 12 includes, for example, smoothing processing for smoothing irregularities of the contour of image data, conversion processing of the pixel density or the line density in a case where an image is enlarged or reduced, and conversion processing of the pixel density due to the difference between the density of the image data applied and the resolution of the LSU 22. In the output processing, a smoothing pattern corresponding to a pixel which is to be processed in the image data is varied depending on the state of pixels around the pixel which is to be processed, and the logical OR of data on a plurality of lines is carried out to convert the pixel density, so that a memory for holding the image data is required. In addition, when the video signal serving as image data is outputted to the LSU 22 from the image output processing circuit 12, it is necessary to store the video signal once in the line memory serving as a buffer, read out the video signal from the line memory serving as a buffer and output the video signal to the LSU 22 because there is a difference between the speed for output processing and the processing speed of the LSU 22. Consequently, the line memory is required. Also in the output processing, therefore, the memory 18 is made use of.

Access to the memory 18 by the image output processing circuit 12 is made in synchronization with the memory access synchronous clock SYSCLK and is made through the input image processing circuit 11, similarly to the access to the memory 18 by the input image processing circuit 11. Therefore, the image output processing circuit 12 applies a memory request signal MREQ and a write strobe signal /PRTWE or a read strobe signal /PRTRE to the input image processing circuit 11, and designates an address to write or read out data to or from an area where the address is designated.

Meanwhile, the image output processing circuit 12 and the input image processing circuit 11 are asynchronously operated. Accordingly, the access to the memory 18 by the image output processing circuit 12 must be so devised as not to interfere with the access to the memory 18 by the input image processing circuit 11.

Such construction as not to interfere with the access to the memory 18 which is shared between the input image processing circuit 11 and the image output processing circuit 12 irrespective of the fact that the input image processing circuit 11 and the image output processing circuit 12 are asynchronously operated will be described with reference to FIGS. 1 and 2.

Figure 1:
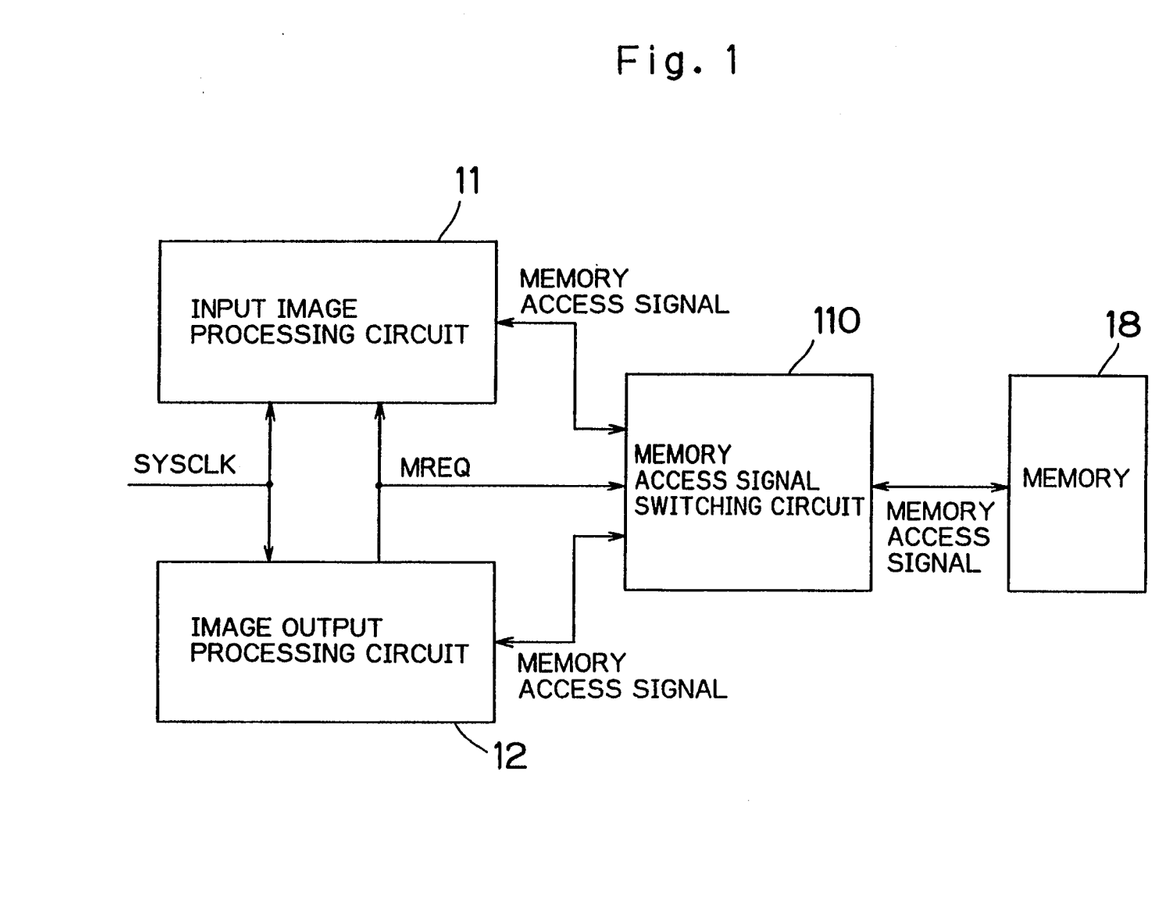
FIG. 1 is a block diagram for explaining the concept of the construction of a circuit according to one embodiment of the present invention.

FIG. 1 is a block diagram showing the relationship among the input image processing circuit 11, the image output processing circuit 12 and the memory 18 shown in FIG. 3 from the point of view of sharing of the memory 18. In FIG. 1, access to a memory (an SRAM) 18 by an input image processing circuit (an FIP section) 11 and an image output processing circuit (a PRT section) 12 are switched by a memory access signal switching circuit 110. This memory access signal switching circuit 110 is a selector for merely switching a signal path, and is contained in the input image processing circuit 11 in the example of the actual circuit shown in FIG. 3.

In FIG. 1, a memory access synchronous clock SYSCLK is applied to the input image processing circuit 11 and the image output processing circuit 12. In addition, a memory access request signal MREQ is applied to the input image processing circuit 11 from the image output processing circuit 12. This request signal MREQ is also applied to a memory access signal switching circuit 110 (this circuit is actually contained in the input image processing circuit 11, as described above), to switch the memory access signal switching circuit 110 to select the input image processing circuit 11 or the image output processing circuit 12.

When the memory access signal switching circuit 110 selects the input image processing circuit 11, the input image processing circuit 11 can access the memory 18, so that a memory access signal (including an address and data) is exchanged between the input image processing circuit 11 and the memory 18.

On the other hand, when the memory access signal switching circuit 110 selects the image output processing circuit 12, a memory access signal (including an address and data) is exchanged between the image output processing circuit 12 and the memory 18.

Figure 2:
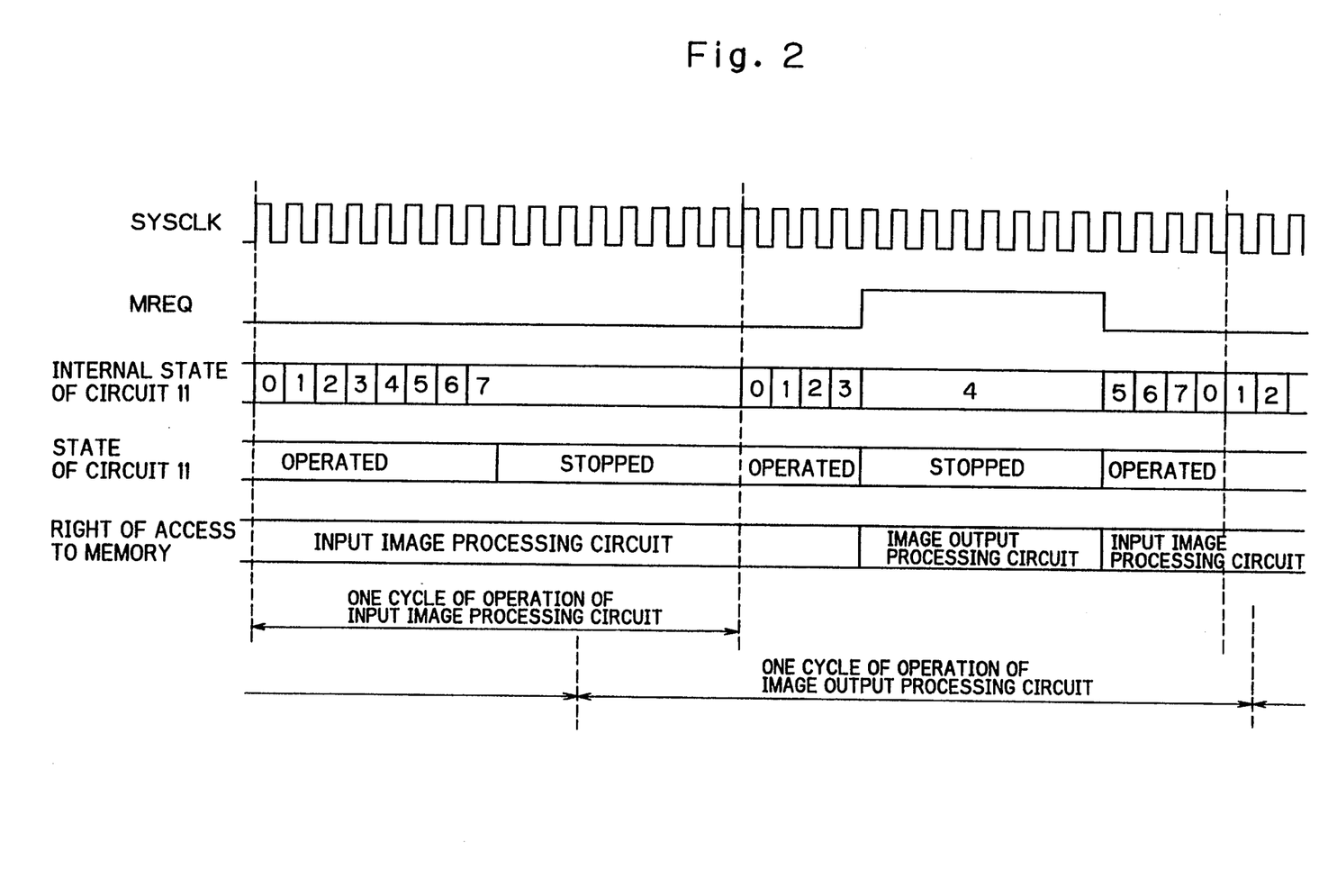
FIG. 2 is a timing chart for explaining a memory access operation in the circuit shown in FIG. 1.

FIG. 2 is a timing chart showing a memory access operation in the circuit shown in FIG. 1.

Description is made with reference to FIGS. 1 and 2. The input image processing circuit 11 and the image output processing circuit 12 are asynchronously operated as described above. A common memory access synchronous clock SYSCLK is applied to both the circuits. Therefore, the input image processing circuit 11 and the image output processing circuit 12 access the memory 18 in synchronization with this memory access synchronous clock SYSCLK while being asynchronously operated.

When the memory access request signal MREQ is not outputted from the image output processing circuit 12, the memory access signal switching circuit 110 selects the input image processing circuit 11, so that the input image processing circuit 11 has the right of access to the memory 18.

Furthermore, sixteen memory access synchronous clocks SYSCLK exist within a unit operation time period required for the input image processing circuit 11 to process data corresponding to one pixel (hereinafter referred to as "one cycle"). Moreover, access to the memory 18 within one cycle is completed by eight clocks out of the sixteen clocks. Consequently, the input image processing circuit 11 is so adapted as to perform the memory access operation on the basis of eight clocks out of sixteen memory access synchronous clocks SYSCLK and enter the stopped state (the wait state) during a period of the remaining eight clocks for each cycle.

The reason why one cycle of the operation of the input image processing circuit 11 is thus constituted by sixteen memory access synchronous clocks SYSCLK is that the read image data applied from the image sensor 15 to the input image processing circuit 11 is inputted for each pixel in synchronization with the driving clock CCLK having a relatively low frequency, for example, approximately 400 KHz, while the memory access synchronous clock SYSCLK is a clock having a relatively high frequency, for example, 20 MHz. Specifically, if one cycle of the operation of the input image processing circuit 11 is determined utilizing as a unit a time period during which read image data corresponding to one pixel is applied to the input image processing circuit 11, sixteen memory access synchronous clocks SYSCLK are provided in one cycle.

As a result of the foregoing, even when the input image processing circuit 11 has the right of access to the memory 18, it is in the stopped state in a period of eight memory access synchronous clocks SYSCLK for each cycle.

On the other hand, the memory access request signal MREQ is applied to the input image processing circuit 11 and the memory access signal switching circuit 110 at arbitrary timing from the image output processing circuit 12 which is operated asynchronously with the input image processing circuit 11. If this request signal MREQ is applied, the memory access signal switching circuit 110 selects the image output processing circuit 12, as described above.

Furthermore, the input image processing circuit 11 stops operating in response to the memory access request signal MREQ and transfers the right of access to the memory 18 to the image output processing circuit 12. Therefore, the image output processing circuit 12 can access the memory 18. A time period during which the memory 18 is accessed once by the image output processing circuit 12 is predetermined, for example, a period of eight memory access synchronous clocks SYSCLK.

More specifically, the image output processing circuit 12 is operated in a predetermined cycle, and processes data corresponding to one pixel in each cycle. A time period during which the memory 18 is accessed in each cycle is predetermined, for example, a period of eight memory access synchronous clocks SYSCLK. On the other hand, the length of one cycle of the operation of the image output processing circuit 12 is set to not less than sixteen memory access synchronous clocks SYSCLK, and the cycle is asynchronous with the cycle of the operation of the input image processing circuit 11. In addition, the length of one cycle of the operation of the image output processing circuit 12 may be varied when an output image is enlarged or reduced.

When the memory 18 has been accessed once by the image output processing circuit 12, the memory access request signal MREQ from the image output processing circuit 12 attains a low level. Therefore, the memory access signal switching circuit 110 is switched to the input image processing circuit 11, so that the input image processing circuit 11 acquires the right of access to the memory 18 again.

In this case, a time period during which the memory 18 is accessed by the input image processing circuit 11 may be a period of eight memory access synchronous clocks SYSCLK for each cycle. If the period of eight memory access synchronous clocks SYSCLK is compensated for as the time period during which the memory 18 is accessed for each cycle, the access to the memory 18 by the input image processing circuit 11 can be made without being interfered with.

Specifically, even if the memory access request signal MREQ from the image output processing circuit 12 interrupts with arbitrary timing, the operation of the input image processing circuit 11 may be stopped in a time period during which the request signal MREQ interrupts the operation thereof. Moreover, even if this request signal MREQ interrupts the operation of the input image processing circuit 11, a time period during which the operation is stopped inevitably exists in each cycle. The time period during which the operation is stopped exists at arbitrary timing in one cycle. Accordingly, the access to the memory 18 by the input image processing circuit 11 can be made without being interfered with.

Furthermore, the access to the memory by the image output processing circuit 12 can be made at an arbitrary time for each cycle.

When the facsimile thus comprises the input image processing circuit 11 and the image output processing circuit 12 and the memory 18 which are shared between the two circuits, the order of priority is so determined that the access to the memory 18 by the image output processing circuit 12 precedes the access to the memory 18 by the input image processing circuit 11, so that the access to the memory 18 by the input image processing circuit 11 is interrupted while the image output processing circuit 12 is accessing the memory 18. Consequently, the image output processing circuit 12 can perform image output processing for image formation using the LSU 22. Moreover, the access to the memory 18 required therefor can be made at arbitrary timing as required.

On the other hand, the access to the memory 18 by the input image processing circuit 11 can be made without being interfered with because the time period during which the memory 18 is accessed in one cycle is compensated for.

In the facsimile, therefore, the image output processing circuit 12 must be thus given the higher priority for access to the memory 18 without interfering with the image output processing using the LSU 22.

Description was now made by taking as an example the input image processing circuit 11 and the image output processing circuit 12 and the memory 18 which are shared between the two circuits in the facsimile, any construction may be used in the present invention provided that it meets the following requirements.

Specifically, two image data processing circuits A and B which are asynchronously operated, and a shared memory M is connected to the two image data processing circuits A and B. The circuits A and B are so constructed as to access the memory M in synchronization with the same memory access synchronous clock. In addition, the maximum time period TA during which the memory is accessed in a unit operation time period SA required for the circuit A to process data corresponding to one pixel and the maximum time period TB during which the memory is accessed in a unit operation time period SB required for the circuit B to process data corresponding to one pixel are so determined as to satisfy the following conditional expressions:

$SA \geq TA + TB$, and $SA \leq SB$

If such conditions are satisfied, the construction of the present invention is realized.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image data processing circuit comprising:
    a first image data processing circuit;
    a second image data processing circuit which is operated asynchronously with the first image data processing circuit; and
    storing means for storing data which is shared between the first image data processing circuit and the second image data processing circuit, and wherein
    the first image data processing circuit and the second image data processing circuit access the storing means in synchronization with the same clock,
    an order of priority is so set that access to the storing means by the second image data processing circuit precedes access to the storing means by the first image data processing circuit, and access to the storing means by the first image data processing circuit is interrupted while the second image data processing circuit is accessing the storing means, and
    a unit operation time period, S1, required for the first image data processing circuit to process data corresponding to one pixel, a maximum time period, T1, during which the first image data processing circuit can access the storing means in the unit operation time period, S1, a unit operation time period, S2, required for the second image data processing circuit to process data corresponding to one pixel and a maximum time period, T2, during which the second image data processing circuit can access the storing means in the unit operation time period, S2, are set, so as to satisfy the following conditions:

$S1 \geq T1 + T2$, and $S1 \leq S2$.

2. The image data processing circuit according to claim 1, further comprising
    an access signal switching circuit for selecting a state where the first image data processing circuit can access the storing means by connecting the first image data processing circuit and the storing means or a state where the second image data processing circuit can access the storing means by connecting the second image data processing circuit and the storing means, and wherein
    the access signal switching circuit connects the second image data processing circuit and the storing means when the second image data processing circuit requests access to the storing means, while the access signal switching circuit connects the first image data processing circuit and the storing means when the second image data processing circuit does not request access to the storing means.

3. A method of accessing a storing means which is shared between two image data processing circuits which are asynchronously operated, comprising the steps of:
    determining a common access asynchronous clock in a case where the two image data processing circuits access the storing means;
    determining an order of priority for access to the storing means between the two image data processing circuits;
    interrupting access to the storing means by a lower-priority image data processing circuit when a higher-priority image data processing circuit requests access to the storing means while the lower-priority image data processing circuit is accessing the storing means to cause the higher-priority image data processing circuit to access the storing means; and
    resuming access to the storing means by the lower-priority image data processing circuit after access to the storing means by the higher-priority image data processing circuit is terminated, and wherein
    a unit operation time period, S1, required for said lower-priority image data processing circuit to process data corresponding to one pixel, a maximum time period, T1, during which the lower-priority image data processing circuit can access the storing means in the unit operation time period, S1, a unit operation time period, S2, required for the higher-priority image data processing circuit to process data corresponding to one pixel and a maximum time period, T2, during which the higher-priority image data processing circuit can access the storing means in the unit operation time period, S2, are determined, so as to satisfy the following conditions:

$S1 \geq T1+T2$, and $S1 \leq S2$.

* * * * *